P. H. RUSSELL.
FIRELESS COOKING UTENSIL.
APPLICATION FILED JULY 7, 1915. RENEWED MAY 13, 1919.
1,310,635. Patented July 22, 1919.
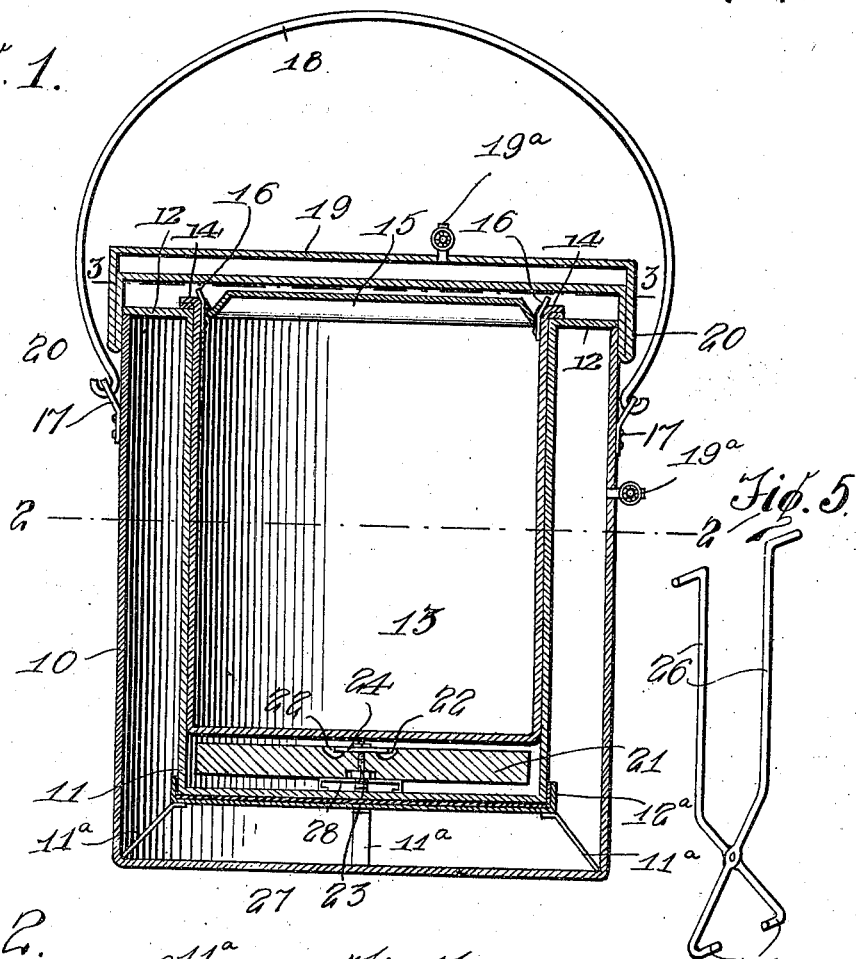
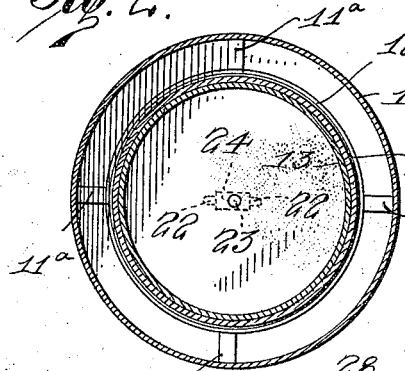
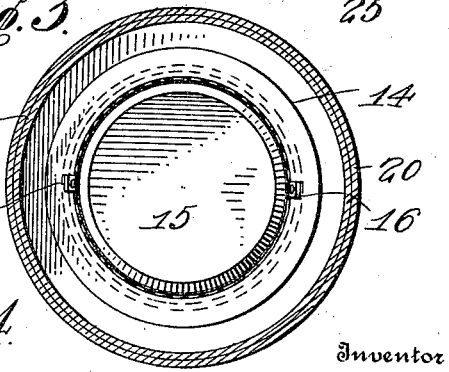
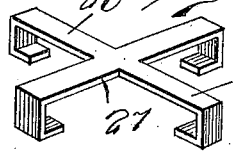
Witnesses
C. R. Hardy
Inventor
Parlee H. Russell
By Richard B. Owen,
Attorney

UNITED STATES PATENT OFFICE.

PARLEE H. RUSSELL, OF VAN BUREN, OHIO.

FIRELESS COOKING UTENSIL.

1,310,635. Specification of Letters Patent. Patented July 22, 1919.

Application filed July 7, 1915, Serial No. 38,583. Renewed May 13, 1919. Serial No. 296,927.

*To all whom it may concern:*

Be it known that I, PARLEE H. RUSSELL, a citizen of the United States, residing at Van Buren, in the county of Hancock and State of Ohio, have invented certain new and useful Improvements in Fireless Cooking Utensils, of which the following is a specification.

This invention relates to that class of kitchen articles known as fireless cookers and is particularly concerned in the provision of a utensil adapted to contain the heating element and the food to be cooked, such utensil being formed with an inner and an outer shell and having a vacuum space provided between such shells.

An object of equal importance with the foregoing is to provide a vacuum cover for the cooking pot which shall be adapted to complete the surrounding of the heating element and the food to be cooked with a complete vacuum chamber.

Further objects of importance are concerned with the provision of a food container equipped with a pair of inwardly secured ears for engagement with a bail or similar means when transporting the container; the provision of a heating element which may be readily removed from its position within the cooker and normally below the food container and with a one piece support means for preventing contact with the heating element directly with the inner shell of the cooker.

The above and additional objects which will become apparent as this explanatory description proceeds, are accomplished by such means as are illustrated in the accompanying drawings, described in the following specification and then more particularly pointed out in the claim which is appended hereto and forms a part of this application.

With reference to the drawings, wherein there is illustrated the preferred embodiment of this invention as it is reduced to practice, and throughout the several views of which like characters of reference designate similar parts:—

Figure 1 is a vertical sectional view of the cooker and food container, as positioned for use;

Figs. 2 and 3 are horizontal sectional views taken on the respective lines 2—2 and 3—3 of Fig. 1, and Figs. 4 and 5 are detail perspective views of the support and the removing tongues for the heating element respectively.

While fireless cookers have been previously devised to contain a heating element, insulated after some fashion against radiation losses, this invention provides a fireless cooker, the pot of which shall consist of outer shells 10 and 11 respectively. Both of these shells are of open mouthed cylindrical form, which may be constructed from a suitable durable material. The inner shell 11 is of such less diameter, with respect to the inclosing shell 10 as to provide an air space between the shells, and such inner shell is formed with the annular flange 12 surrounding its open mouth for the support thereof upon the upper edge of the inclosing shell, and with legs 11ª which may if desirable support a suitable tray 12ª lined against heat losses to form a rest for the bottom of the inner shell 11 in maintaining a fixed space between the shells. These shells are hermetically sealed and the air exhausted from the space between the shells in order to provide an insulating vacuum.

The food container 13 is adapted to fit snugly within the inner shell 11 and has its bottom spaced from the bottom of such inner shell, when its upper flange 14 is engaging with the flange 12 in supporting the container. A cover 15 is removably provided for this container and is adapted to be firmly seated upon the upper open mouth thereof, such cover being provided with suitable slots through which there are adapted to project a pair of diametrical, apertured ears 16 which are secured interiorly of the container in order not to interfere with the positioning thereof within the shell 11. These ears provide for removal of the container, whether covered or uncovered, by engagement therewith of a suitable wire bail of such customary construction as not to require illustration. Similar ears 17 are secured to the outer shell 10 and may be permanently engaged by the wire bail 18 for transportation of the cooker as a whole. The cover 19 has its flanged edge 20 doubled back upon itself in order to form an upper insulation chamber completing the circuit of nonconductors of heat which are adapted to completely surround the food container and the heating element of the cooker. Air may be exhausted from the insulation chamber 19 by employing a valve of any suitable type such as is designated 19ª. A similar valve is employed for the same purpose with reference to the space between the shells 10 and 11.

The heating element is designated 21 and may be a thickened disk of soapstone or a similar material adapted to slowly radiate the heat imparted to it. Grooves 22 are provided at the center of the disk and radiate from bolt means 23 whereby a central metallic plate 24 is maintained upon the upper face of the disk. The edges of this plate overlap the inner edges of the grooves 22 in order to provide a keeper for the jaws 25 of tong means designated 26 as a whole and illustrated in Fig. 5, as being particularly adapted for the removal of this heating element or the positioning thereof within the inner shell 11. A bridge support 27 includes a plurality of integral crossed arms 28, the extremities of which are doubly bent into the same plane and spaced from the main portions of the arms. Upon this bridge the heating disk is supported in spaced relation to the bottom of the inner shell 11, thus effecting a material decrease, in conjunction with the vacuum chambers provided to surround both heating element and food container, in heat losses by radiation. It will be obvious also that the vacuum chamber construction of the cooker of this invention renders the same capable of efficient use as a refrigerating container should the heating element be replaced by cooling means, such as ice, waste from which would be prevented in the same manner by the surrounding vacuum chambers.

While in the foregoing, however, there has thus been illustrated in the drawings and described in the specification, such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claim.

What is claimed is:

A fireless cooking utensil comprising an outer shell formed with an open upper end, an inner shell shorter and of less diameter than the outer shell and centrally disposed within the same, said inner shell being open at its upper end and having an external horizontal flange at its mouth resting upon the mouth of the outer shell and sealed thereto to provide a vacuum chamber between said shells, and to partly support the inner shell, a shallow tray within the outer shell into which the bottom of the inner shell snugly fits, legs secured to said tray for supporting it a short distance above the bottom of the outer shell, heat insulating material inserted between the tray and the bottom of the inner shell, a removable food container snugly fitting the inner shell at the sides and spaced a short distance from the bottom thereof, said container having an exterior flange at its top adapted to rest on the flange connecting the inner and outer shells and forming the sole means of supporting the container within the utensil, a closure for the food container, and a cover fitting over the entire utensil.

In testimony whereof I affix my signature in presence of two witnesses.

PARLEE H. RUSSELL.

Witnesses:
F. P. BLUEFORD,
GRACE DUTTWEILER.

Copies of this patent may be obtained for five cents each, by addressing the "Commissioner of Patents, Washington, D. C."